(12) United States Patent
Strandgaard

(10) Patent No.: US 6,319,579 B1
(45) Date of Patent: Nov. 20, 2001

(54) SETTABLE MIXTURE AND A METHOD OF MANUFACTURING A SOUND INSULATING FLOOR CONSTRUCTION

(75) Inventor: Christian Strandgaard, Værløse (DK)

(73) Assignee: SIKA AG, vorm. Kaspar Winkler & Co., Zurich (CH)

( * ) Notice: Subject to any disclaimer, the term of this patent is extended or adjusted under 35 U.S.C. 154(b) by 0 days.

(21) Appl. No.: 09/454,370

(22) Filed: Dec. 3, 1999

Related U.S. Application Data

(63) Continuation-in-part of application No. PCT/DK97/00243, filed on Jun. 3, 1997, now abandoned.

(51) Int. Cl.$^7$ .................................................. B32B 3/10
(52) U.S. Cl. ................................................ 428/45; 428/48
(58) Field of Search ........................ 428/45, 48; 106/687, 106/688

(56) References Cited

FOREIGN PATENT DOCUMENTS

| 25 50 857 | 5/1977 | (DE) . |
| 30 31 086 A1 | 4/1982 | (DE) . |
| 35 16 704 C1 | 5/1987 | (DE) . |
| 1 160 350 | 12/1963 | (GB) . |
| 1 188 140 | 4/1970 | (GB) . |
| 1 466 596 | 3/1977 | (GB) . |
| 373 562 | 2/1975 | (SE) . |
| WO 89/02422 | 3/1989 | (WO) . |

OTHER PUBLICATIONS

Article from selected pages of the May 1957, Jul. 1957 and Oct. 1957 issue of Handbuch der Steinholztechnik.
Article from the journal Zeitschrifft fur Binnenschiffahrt, 8/68, by; Werner Kruse, entitled: Moglichkeiten zur Lambekampfung. . .
*Estriche und Bodenbelage im Hochbau*, By: Friedrich Eichler, VEB Verlag Technik Berlin, 1955, pp. 189–192.
*Lexikon der gesamten Technik und ihrer Hilfswissenchaften, Werkstoffe und Werkstoffprufund*, Publisher: Stuttgart, Dt.—Verlagsanstalt, 1961, vol. 3. Lex. –8, XVI, 816, pp. 674–675.

*Primary Examiner*—Alexander S. Thomas
(74) *Attorney, Agent, or Firm*—Thomas R. Vigil

(57) ABSTRACT

A settable mixture comprising magnesium oxide, magnesium chloride, water, resiliently compressible fibers, and a filler material produces a cement with high strength and excellent sound attenuation properties, avoiding the expansion properties observed in comparable prior art mixtures. The mixture may be used in a method of manufacturing a sound insulating floor construction on top of a floor base (1) and within confinement walls (2), the method comprising applying on top of the floor base a layer of soft, resilient mats (3), arranging along the confinement walls a spacer list (4) comprising a sort, resilient material, pouring on top of the mats the mixture, leveling the top surface of the mixture, and allowing it to set to form a solid slab (5).

11 Claims, 2 Drawing Sheets

SETTABLE MIXTURE AND A METHOD OF MANUFACTURING A SOUND INSULATING FLOOR CONSTRUCTION

CROSS-REFERENCE TO RELATED APPLICATIONS

This application is a continuation-in-part of international application number PCT DK/97/00243, filed Jun. 3, 1997 abandoned.

BACKGROUND OF THE INVENTION

1. Field of the Invention

The present invention relates to a settable mixture comprising magnesium oxide and magnesium chloride. The invention further relates to a method of manufacturing a sound insulating floor construction and to a sound insulating floor construction.

Mixtures of magnesium oxide and magnesium chloride, sometimes referred to as Sorel cement, are known in the art for application as binders for industrial floorings, for which purpose they are favored on account of high elasticity and bending tensile strength properties. It is also known in the art to manufacture lightweight building slabs comprising Sorel cement in combination with wood chippings.

2. Description of the Prior Art

International patent publication no. WO89/02422 discloses a settable magnesium cement composition comprising magnesium oxide, magnesium chloride and coarse fibrous long-stranded sawdust. In the composition suggested the content of magnesium chloride constitutes approximately one third of the content of magnesium oxide as measured by weight Suggested applications comprise use as a floor leveling compound or manufacture of moulded products such as tiles and the like. Particular advantages claimed with this composition comprise reduction of sweating, reduction of dust, better control over product quality, and sound attenuation among others.

German published patent application DE 41 08 562 suggests for a floor leveling compound a mixture of coarse wood chips with granulated foamed polystyrene together with ceramic aggregates and a hydraulic binder such as cement or plaster of Paris. The publication contains in respect of the ceramic aggregate also suggestions for expanded clay aggregate or pumice and others.

A publication "Lexikon der Technik" by Lueger, 1972, page 471 explains Sorel cement used for floor slabs. Filler materials, such as wood chips, paper, cork and stone powder, are mentioned. A solution of magnesium chloride is prepared to a density of 1.16 to 1.19.

A publication "Estriche und Bodenbeläge Im Hochbau" by Diplom-Ing. Friedrich Eichler, VEB Verlag Technik Berlin, 1955, discloses a floor slab cast of Sorel cement on top of an insulation mat. Margin strips are arranged on the walls so as to separate the floor slab from the walls. The publication mentions Sorel cement with fillers, such as wood chips and stone powder. According to this publication, the floor slab must have a thickness of at least 5 cm for reason of structural considerations.

Applicant has found that Sorel cement is highly prone to expansion during setting. Relative expansions in the order of 1% are very likely. Given this rate of expansion a floor slab may, depending on dimensions and boundary constraints, crack and break up. The expansion takes place slowly but keeps growing over an extended period of time. This makes the expansion difficult to monitor accurately during the early stages and means that a risk of self-destruction is there for a long period.

The expansion propensity practically limits the use of Sorel cement to applications as a binder, to products cast in molds or to floor leveling compounds laid in comparatively thin layers and adhered to a floor base, which serves to keep the Sorel cement layer in position.

The applicant has found that the admixing of wood fibres in any substantial amount tends to make the mixture sticky and viscous and hence difficult to mix properly and difficult to apply. Improper mixing is detrimental to the structural integrity of the hardened product and likely to aggravate expansion problems.

SUMMARY OF THE INVENTION

The invention, in a first aspect, provides a settable mixture of ingredients comprising quantities of ingredients as follows:

between 12 and 18% by weight of MgO, between 12 and 18% by weight of $MgCl_2$, $H_2O$ in a quantity appropriate to produce together with the $MgCl_2$ ingredient a slurry of a density within the range of 1.16 to 1.20 g/cm$^3$, and balance up to 100% of resiliently compressible fibres and a filler material.

This mixture combines the advantageous effects of Sorel cement in high elasticity and bending tensile strength as well as sound attenuation in a material where the expansion propensity is a factor of ten lower than is the case in other Sorel cements. Expansion rates in the order of one per thousand are easily achieved, meaning that even large slabs may be cast without any problems. The mixture is easy in mixing and in application. The strength of the mixture when set is comparable to that of ordinary cements This performance of the inventive mixture is believed to be attributable to a number of factors. The filler material serves to dilute the expansion propensity by replacing corresponding volumes of magnesium oxide and magnesium chloride. The resiliently compressible fibres are believed to restrain expansion while also being capable of absorbing expansion internally through compression.

Although a range of proportions between the ingredients may be used, it is believed that roughly equal portions by weight of $MgCl_2$ and MgO will further the formation of strong and stable crystal structures in the product when set.

According to a preferred embodiment, the resiliently compressible fibres comprise ligneous fibres such as wood chips or sawdust. These fibres are preferably finely grained in order that the liquid mixture will stay fluent until it sets.

According to a preferred embodiment, the filler material comprises an expanded material. The expanded material reduces the density of the compound and permits internal absorption or expansion, the spheres of the expanded material being capable of collapsing internally so as to relieve any pressure in the immediate surroundings. The spheres of the expanded material do not corrupt the fluency of the mixture.

According to a preferred embodiment, a part of the filler material comprises comminuted aggregate such as fine gravel or stone dust. These materials contribute to the excellent strength of the mixture when set.

The invention, in a second aspect, provides a method of manufacturing a sound insulating floor construction on top of a floor base and within confinement walls, comprising the steps of applying on top of the floor base a layer of soft, resilient mats, arranging along the confinement walls and at least partially above a top side of said layer of mats a spacer list comprising a soft, resilient material, pouring on top of said layer top side a mixture comprising magnesium oxide, magnesium chloride, water, resiliently compressible fibres and a filler material, said filler material comprising at least one ingredient selected from a group comprising an expanded material, expanded clay aggregate, expanded glass, expanded polymer and pumice, leveling the top surface of said mixture, and allowing said mixture to set to form a solid slab.

This method provides the manufacturing of a floor comprising a floating slab made of the inventive mixture. The floating arrangement of this slab by the soft resilient support under the bottom as well as along all sides decouples any body transmission of sound or vibration waves and hence achieves excellent sound insulation capabilities. The insulation properties are further enhanced by the inherent sound deadening features of the inventive mixture. The floor slab may be cast in situ even in very large formats.

Although this floor construction is generally applicable it is particularly favored in critical fields of application such as accommodations on ships where spaces are narrow and where the requirements to weight, sound insulation, vibration insulation and fire resistance are extreme.

The invention, in a third aspect, provides a sound insulating floor construction adapted for installation on top of a floor base and within confinement walls, comprising a layer of soft, resilient mats, arranged on top of the floor base, a spacer means adapted to maintain a spacing to the confinement walls, and a slab placed on top of said layer of mats, said slab having been formed by pouring on top of said layer of mats and within said spacer means a mixture of ingredients comprising magnesium oxide, magnesium chloride, water, resiliently compressible fibres and a filler material, said filler material comprising at least one ingredient selected from a group comprising an expanded material, expanded clay aggregate, expanded glass, expanded polymer and pumice, leveling a top surface of said mixture, and allowing said mixture to set.

This provides a floor construction which is well suited for installation in circumstances with stringent requirements to sound insulation capabilities, light weight and little space such as on board ships.

BRIEF DESCRIPTION OF THE DRAWINGS

Further features, advantages and objects of the invention will appear more clearly from the appended detailed description of particular modes of execution, referring also to the appended drawings, whereon

DESCRIPTION OF THE PREFERRED EMBODIMENTS

Example A

Figure 1:
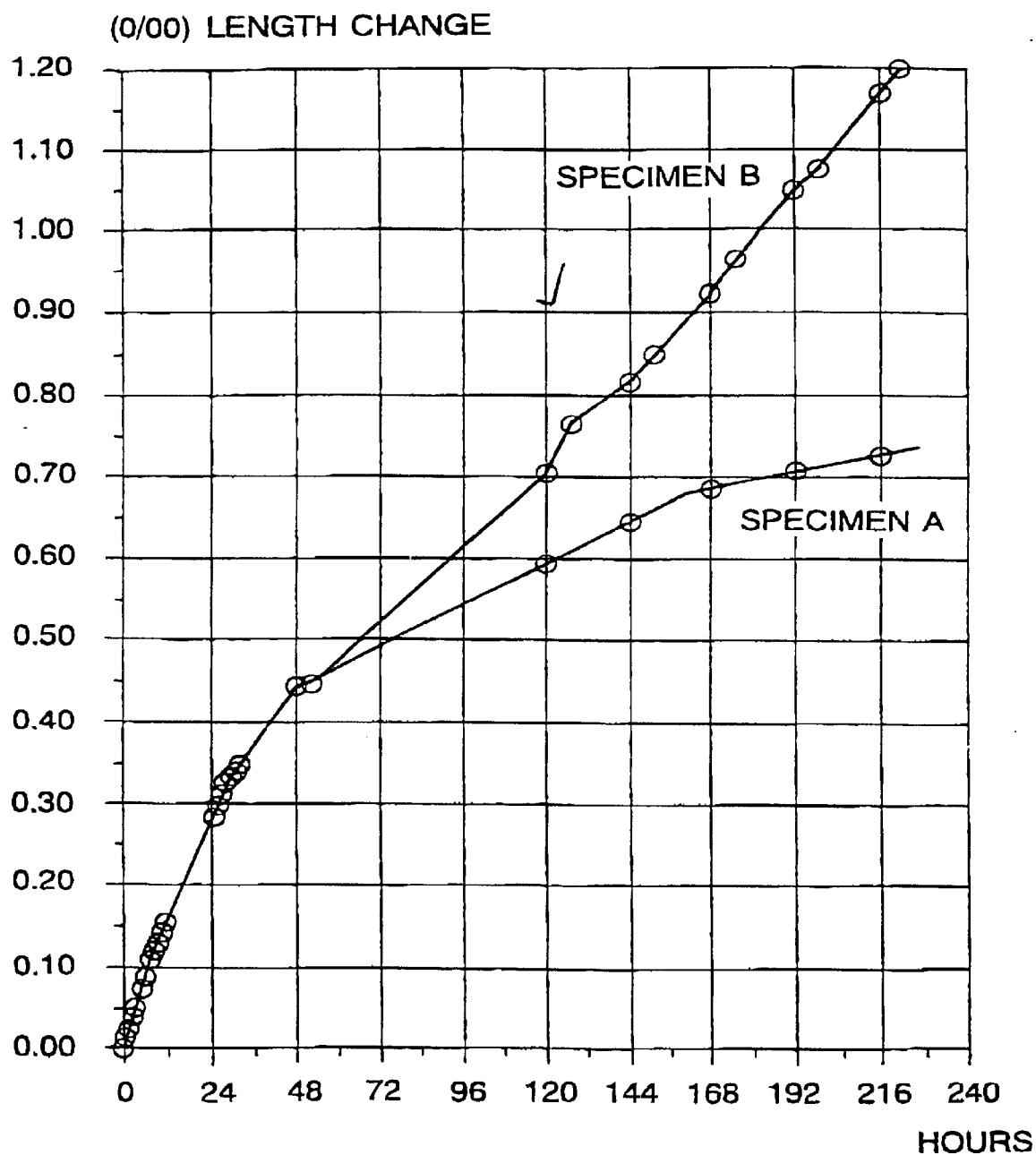
FIG. 1 is a diagram illustrating expansion in specimens made of two Sorel cement compounds, specimen A comprising a compound according to the invention, specimen B comprising a Sorel cement compound according to the prior art.

The following ingredients and quantities were apportioned:

| | | |
|---|---|---|
| Water | 70 kg | 21% |
| Magnesium chloride | 50 kg | 15% |
| Magnesium oxide | 50 kg | 15% |
| Ballast | 157 kg | 49% |
| Total | 327 kg | 100% |

Magnesium chloride was procured from the company Dead Sea Works Ltd of Israel. According to the manufacturers specification, commercial grade magnesium chloride contains 47% by weight of $MgCl_2$, approximately 3% by weight of various impurities and approximately 50% by weight of water. The density of the magnesium chloride is 1.6 $g/cm^3$.

Magnesium oxide was procured from the company Lehmann & Voss & Co KG in Germany According to the manufacturers specification, the commercial grade of magnesium oxide contains approximately 90% by weight of MgO.

The ballast comprises a premix including, as measured by volume, one part of expanded clay aggregate, one part of stone dust, and two parts of fine wood chips.

157 kg of this premix fills a volume of 193 liters.

Magnesium chloride is mixed with water and stirred until a homogenous mixture is obtained. Thereafter magnesium oxide and ballast is admixed.

Test specimens were cast and set. The density of these specimens was approximately 1.3 $g/cm^3$.

Compression tests have been carried out on samples cast in the mixture of example A. The test specimens proved capable of supporting a loading of 20 MPa before fracturing.

Example B

Ingredients as in example A except for the ballast which was here replaced with 250 kg fine gravel which mass fills a volume of 193 liters. Mixing procedure as in example A.

Example C

The following ingredients and quantities were apportioned:

| | | |
|---|---|---|
| Water | 70 kg | 21% |
| Magnesium chloride | 50 kg | 18% |

-continued

| | | |
|---|---|---|
| Magnesium oxide | 50 kg | 18% |
| Ballast | 112 kg | 39% |
| Total | 282 kg | 100% |

The ballast comprises a premix including as measured by volume:
- 6 parts of fine wood chips,
- 3 parts of expanded clay aggregate,
- 3 parts of expanded perlite, and
- 2 parts of expanded fly ash Test specimen were cast and set. The density was 0.9 g/cm$^3$. Compression tests revealed that the strength is somewhat lower than that of the example A specimen.

Example D

The following ingredients and quantities were apportioned
- 50 kg magnesium chloride,
- 50 kg magnesium oxide, and
- 157 kg ballast.

The ballast comprises a premix including, as measured by volume,
- one part of expanded clay aggregate,
- one part of stone dust, and
- two parts of fine wood chips.

157 kg of this premix fills a volume of 193 liters.

Water is added to the magnesium chloride, which is stirred while the density of the slurry is monitored. A proper mixture is obtained when the magnesium chloride is well slurred and the density is in the range between 1.16 and 1.20 g/cm$^3$. Given a magnesium chloride density of 1.6 g/cm$^3$, the volume of 50 kg of magnesium chloride may be computed as 31.25 liters. The addition of 70 liters of water, equivalent to 70 kg, will yield a mixture comprising approximately 120 kg and 101.25 liters, thus a density in the mixture of approximately 1.19 g/cm$^3$. Subsequently, magnesium oxide and ballast is admixed.

Test specimens were cast and set. The density of these specimens was approximately 1.3 g/cm$^3$.

Compression tests have been carried out on samples cast in the mixture of example D. Test specimens proved capable of supporting a loading of 20 MPa before fracturing.

Test specimens measuring 100×100×400 mm were cast with the mixture of example A and with the mixture of example B. The test specimens were allowed to set in a controlled climate at a temperature of 23° C. and 43% relative humidity. Expansion during setting was recorded at various intervals through approximately 9 days, counted from the day of the casting.

Results of these measurements are given in the graph in FIG. 1. This graph reveals for both test specimens a relatively rapid expansion during the first 48 hours. From this instant the curves separate, specimen A exhibiting after 216 hours an expansion of approximately 0.73/1000 and with a tendency to level off from at this point onwards, whereas specimen B exhibited an expansion of about 1.16/1000 at the same instant and still growing at an undiminished rate.

It is noted that the particular expansion may depend on the particular dimensions and shape. Anyway, the curve confirms that the expansion of the inventive mixture is far lower than that of other mixtures and within acceptable levels.

Figure 2:
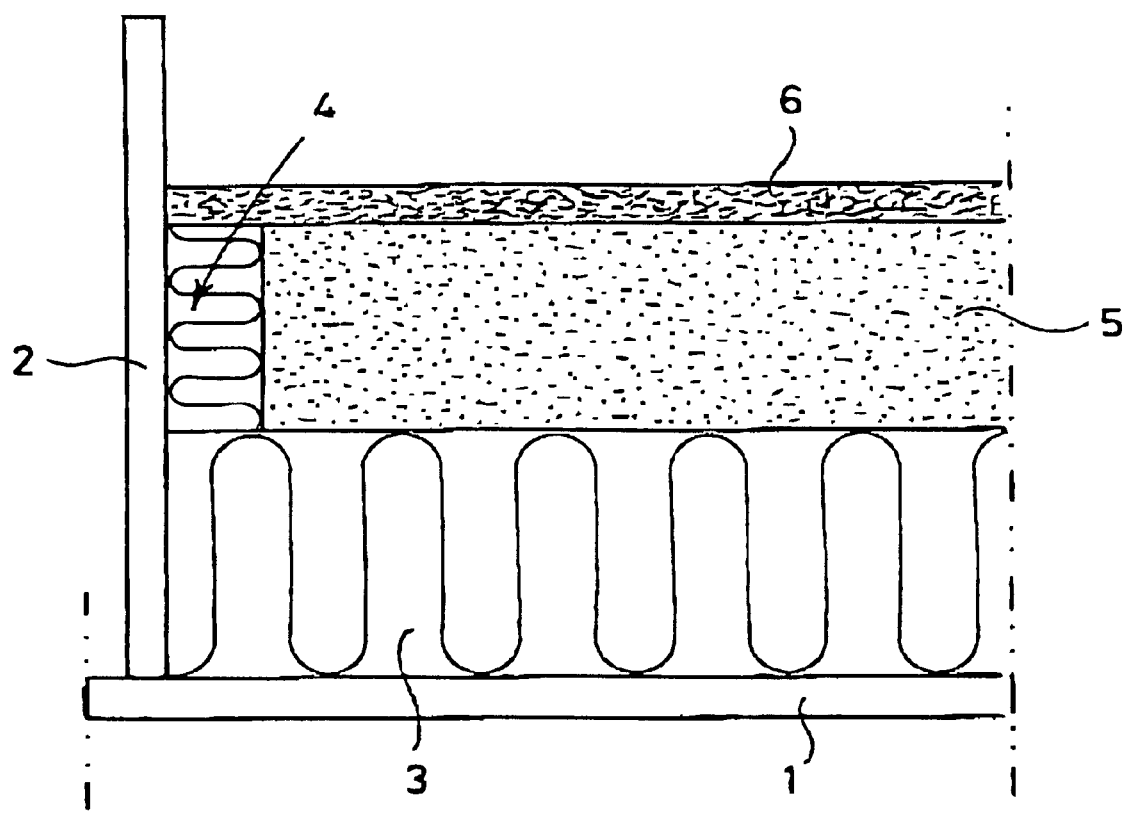
FIG. 2 is a vertical section through part of a sound insulating floor construction according to the invention.

FIG. 2 illustrates a vertical section through part of a ship accommodation wherein a sound insulating floor construction has been installed. The ship accommodation is basically installed on top of a horizontal floor base 1 and within vertical bulk head walls 2, both comprising solid steel plates which are part of the ship structure.

On top of the floor base a layer of soft resilient mats 3, such as mineral wool fibres or rockwool is applied. The thickness of these mats may be in the range from 10 to 200 mm, e.g. 50 mm.

Above this layer of mats and along the bulk heads a spacer list 4 comprising also a soft resilient material such as mineral wool fibres or rockwool is placed. The vertical dimension of this list may in one example be 25 mm, the horizontal extension may be 10 mm. Using the layer of mats and the lists as a form, a mixture prepared according to to example A is poured and screeded to form a layer of a depth of 25 mm and allowed to set. When cured the mixture forms a solid slab, supported and constrained with resilient mineral fibres and with no body contact with the ship structure. The cured slab is covered by a carpet 6 which provides an attractive top surface.

This floor construction exhibits excellent sound attenuation performance. The slab supports all normal use, e.g. the placing and moving of furniture and even the installation of light partition walls directly on top of the slab.

An exemplary embodiment of this floor construction has been successfully installed in a ship accommodation measuring 20 by 50 m. The floor slab was cast in one piece, covering the entire area and with no form of expansion joints. No cracking has been observed.

The structure may, depending on the thickness of the rockwool mats, be installed to a building height as shallow as 35 mm and the weight added by this floor construction may be as low as 37 kg/m$^2$ in case of a 25 mm slab composed according to the example A on top of 30 mm rockwool mats, or as low as 27 kg/m$^2$ in case of a 25 mm slab composed according to the example C on top of 30 mm of rockwool mats.

Although, various components, designs and methods have been explained in particular examples above this is not to exclude that such components, structures and methods could be applied in other set-ups, might be configured differently or might be separately patentable. Although particular examples have been mentioned, the detailed explanation has the sole purpose of facilitating understanding the invention and is not intended to limit the scope thereof which is defined exclusively by the appended patent claims.

I claim:

1. A method of manufacturing a sound insulating floor construction on top of a floor base and within confinement walls, comprising the steps of:
   applying on top of the floor base a layer of soft, resilient mats,
   arranging along the confinement walls and at least partially above a top side of said layer of mats a spacer list comprising a soft, resilient material,
   pouring on top of said layer top side a mixture comprising magnesium oxide, magnesium chloride, water, resiliently compressible fibres and a filler material, said filler material comprising at least one ingredient selected from a group comprising an expanded material, expanded clay aggregate, expanded glass, expanded polymer and pumice, leveling the top surface of said mixture, and allowing said mixture to set to form a solid slab.

2. A sound insulating floor construction, comprising a layer of soft, resilient mats, a spacer list arranged along a margin of said layer of mats and extending at least partially above a top side of said layer of mats, and a slab formed by pouring on top of said layer of mats and within said spacer list a mixture of ingredients comprising magnesium oxide, magnesium chloride, water, resiliently compressible fibres and a filler material, said filler material comprising at least one ingredient selected from a group comprising an expanded material, expanded clay aggregate, expanded glass, expanded polymer and pumice, leveling a top surface of said mixture, and allowing said mixture to set.

3. The floor construction according to claim 2, wherein said spacer list comprises a soft, resilient material.

4. The floor construction according to claim 2, wherein the resiliently compressible fibres comprise ligneous fibres including wood chips or sawdust.

5. The floor construction according to claim 2, wherein the filler material comprises a grained, substantially non-water absorbing material.

6. The floor construction according to claim 5, wherein a part of the filler material comprises at least one ingredient selected from a group comprising an expanded material, expanded clay aggregate, expanded glass, expanded polymer and pumice.

7. The floor construction according to claim 6, wherein a part of the filler material comprises comminuted aggregate including fine gravel or stone dust.

8. The floor construction according to claim 2, wherein said mixture comprises quantities of said ingredients selected as follows:

between 12 and 18% by weight of MgO, between 12 and 18% by weight of $MgCl_2$, $H_2O$ in a quantity appropriate to produce together with the $MgCl_2$ ingredient a slurry of a density within the range of 1.16 to 1.20 g/cm$^3$, and balance up to 100% of fibres and a filler material.

9. The floor construction according to claim 8, wherein said balance comprises between 40 and 60% by volume of ligneous fibres.

10. The floor construction according to claim 8, wherein said balance comprises between 20 and 30% by volume of expanded material.

11. The floor construction according to claim 8, wherein said balance comprises between 20 and 30% by volume of comminuted aggregate including fine gravel or stone dust.

* * * * *